(12) United States Patent
Martin (10) Patent No.: US 12,196,018 B2
(45) Date of Patent: Jan. 14, 2025

(54) SECURING MECHANISM FOR SECURING A VEHICLE DOOR

(71) Applicant: Airbus Operations GmbH, Hamburg (DE)

(72) Inventor: Alexander Martin, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 206 days.

(21) Appl. No.: 17/824,130

(22) Filed: May 25, 2022

(65) Prior Publication Data

US 2022/0381070 A1    Dec. 1, 2022

(30) Foreign Application Priority Data

Jun. 1, 2021   (EP) .................................... 21177136

(51) Int. Cl.
*E05B 85/20*   (2014.01)
*B64C 1/14*    (2006.01)

(52) U.S. Cl.
CPC ............ *E05B 85/20* (2013.01); *B64C 1/1423* (2013.01)

(58) Field of Classification Search
CPC ...... E05B 85/20; E05B 63/0052; E05B 83/42; E05B 17/2034; E05B 17/20;
(Continued)

(56) References Cited

U.S. PATENT DOCUMENTS 3,851,845 A * 12/1974 Edwards .................. E05C 9/04
                                                                    49/141
5,305,969 A *  4/1994 Odell .................... B64C 1/1407
                                                                  292/259 R
(Continued)

FOREIGN PATENT DOCUMENTS

CN    107747439 A  *  3/2018  ............. E05B 77/04
CN    110043132 A  *  7/2019
(Continued)

OTHER PUBLICATIONS

European Search Report; priority document.

*Primary Examiner* — Christine M Mills
*Assistant Examiner* — Steven A Tullia
(74) *Attorney, Agent, or Firm* — Greer, Burns & Crain, Ltd.

(57) ABSTRACT

A securing mechanism for a vehicle door. The securing mechanism includes: a locking system which includes a locking element configured, in a locking position of the locking element, to lock the vehicle door in a closed position and, in an unlocking position of the locking element, to unlock the vehicle door; a securing element configured, in a securing position, to block a locking element movement from the locking position into the unlocking position in a first direction and, in a release position, to release the movement of the locking element from the locking position into the unlocking position in the first direction; and an actuator configured to move the securing element from the release position into the securing position and/or from the securing position into the release position. The securing element is configured, in the securing position, to release a movement of the locking element in a second direction.

14 Claims, 6 Drawing Sheets

(58) Field of Classification Search
CPC .. E05B 17/2007; E05B 65/00; E05B 65/0882; E05B 15/00; E05B 47/0001; E05B 2047/0017; E05B 51/02; B64C 1/1423; E05C 9/02; Y10T 292/096; Y10T 292/0982; Y10T 292/0985; Y10T 292/1021

See application file for complete search history.

(56) References Cited

U.S. PATENT DOCUMENTS

| | | | | |
|---|---|---|---|---|
| 5,337,977 | A * | 8/1994 | Fleming | B64C 1/143 |
| | | | | D12/345 |
| 5,823,473 | A * | 10/1998 | Odell | B64C 1/1415 |
| | | | | 292/216 |
| 6,318,135 | B1 | 11/2001 | Johnsen et al. | |
| 6,457,674 | B2 * | 10/2002 | Erben | B64C 1/1407 |
| | | | | 244/129.4 |
| 6,691,953 | B2 * | 2/2004 | Leclerc | B64C 1/32 |
| | | | | 49/40 |
| 7,784,315 | B2 * | 8/2010 | Yang | E05C 9/026 |
| | | | | 70/279.1 |
| 10,570,651 | B2 * | 2/2020 | Ueda | E05B 85/20 |
| 10,982,471 | B2 * | 4/2021 | Emrich | B64C 1/1423 |
| 11,560,212 | B2 * | 1/2023 | Savidge | B64C 1/143 |
| 11,661,166 | B2 * | 5/2023 | Mortland | B64C 1/1423 |
| | | | | 244/129.5 |
| 11,667,369 | B2 * | 6/2023 | Gallagher, Jr. | E06B 7/32 |
| | | | | 244/118.5 |
| 11,746,572 | B2 * | 9/2023 | Blum | E05B 83/00 |
| | | | | 292/44 |
| 11,753,138 | B2 * | 9/2023 | Holtrup | B64C 1/1407 |
| | | | | 49/208 |
| 2002/0000493 | A1 | 1/2002 | Erben et al. | |
| 2017/0129585 | A1 * | 5/2017 | Erben | E05B 15/0086 |
| 2020/0181948 | A1 * | 6/2020 | Savidge | B64C 1/1407 |
| 2022/0381070 | A1 * | 12/2022 | Martin | E05C 9/02 |
| 2024/0278899 | A1 * | 8/2024 | Boas | B64C 1/1461 |

FOREIGN PATENT DOCUMENTS

| | | | | |
|---|---|---|---|---|
| DE | 10020825 A1 | | 11/2001 | |
| DE | 102004059840 A1 | * | 9/2005 | ............. E05B 79/20 |
| DE | 102018121307 A1 | * | 3/2020 | ........... B64C 1/1407 |
| EP | 133082 A | * | 2/1985 | ........... B64C 1/1407 |
| EP | 3168139 A1 | * | 5/2017 | ............. E05B 15/00 |
| EP | 3275779 A1 | * | 1/2018 | ........... B64C 1/1407 |
| EP | 3663192 A1 | * | 6/2020 | ........... B64C 1/1407 |
| EP | 3915869 A1 | * | 12/2021 | ........... B64C 1/1407 |
| EP | 3967595 A1 | * | 3/2022 | ........... B64C 1/1407 |
| FR | 3094392 A1 | * | 10/2020 | ......... E05B 47/0012 |

* cited by examiner

SECURING MECHANISM FOR SECURING A VEHICLE DOOR

CROSS-REFERENCES TO RELATED APPLICATIONS

This application claims the benefit of the European patent application No. 21177136.5 filed on Jun. 1, 2021, the entire disclosures of which are incorporated herein by way of reference.

FIELD OF THE INVENTION

The invention relates to a securing mechanism, a vehicle door having the securing mechanism and a door system having the securing mechanism.

Furthermore, a vehicle which comprises the securing mechanism, the vehicle door or the door system is provided. The vehicle may be an aircraft, in particular an airplane.

BACKGROUND OF THE INVENTION

Vehicle doors are used to cover and close an opening in a vehicle in a closed position and, in this instance, to seal off a vehicle interior with respect to the vehicle environment. In specific vehicle types, safety standards have to be complied with. For example, for aircraft doors, it is necessary for them to securely close the aircraft interior both on the ground and during flight operation. In this instance, the door must also be securely closed during a pressure difference applied between the aircraft interior and the aircraft environment. On the other hand, the doors must be able to be opened easily and rapidly in the event of an emergency.

In order to prevent undesirable opening of such doors, for example, during flight operation, locking systems are generally used. These systems are configured to lock the vehicle door in a closed position. For aircraft doors, a so-called "Flight Lock Actuator" (FLA) which blocks the locking system during flight operation of the aircraft is generally provided. A manual opening of the aircraft door during the flight or during travel on the airport is thus intended to be prevented.

In known safety mechanisms, in order to secure aircraft doors, the FLA is generally installed in the door. When the door is installed in the vehicle, a cable connection must then be provided between the aircraft and the FLA. Furthermore, the FLA in known solutions is arranged in a coupling housing together with a portion of the locking system. In the event of an actuation of the FLA between an actuator-moved portion of the FLA and a portion of the locking system which is intended to be blocked, a completely or multi-dimensionally positive-locking connection is also generally formed. This all results in a relatively high assembly complexity and consequently high production costs. In some known FLA systems, material wear may occur in the region of the positive-locking connection.

SUMMARY OF THE INVENTION

An object of the invention is to provide a cost-effective and durable securing mechanism for securing a vehicle door.

According to a first aspect, a securing mechanism for securing a vehicle door is provided. The securing mechanism comprises a locking system which comprises a locking element and which is configured, in a locking position of the locking element, to lock the vehicle door in a closed position and, in an unlocking position of the locking element, to unlock the vehicle door. The securing mechanism further comprises a securing element which is configured in a securing position to block a movement of the locking element from the locking position into the unlocking position in a first direction and in a release position to release the movement of the locking element from the locking position into the unlocking position in the first direction. The securing mechanism comprises an actuator which is configured to move the securing element from the release position into the securing position and/or from the securing position into the release position. The securing element is further configured in the securing position to release a movement of the locking element in a second direction. The second direction may differ from the first direction. For example, the second direction is opposite the first direction.

The securing element may be configured, in the securing position, when the locking element is moved from the locking position into the unlocking position, to come into contact with the locking element and, by means of the contact between the securing element and the locking element, to block the movement of the locking element from the locking position into the unlocking position.

For example, the securing mechanism is configured in such a manner that, in the event of the contact between the securing element and the locking element, a connection which is positive-locking only in the first direction is formed between the securing element and the locking element.

The securing mechanism may be configured in such a manner that the securing element in the securing position in the event of contact with the locking element provides a support for the locking element, wherein the support brings about the blocking of the movement of the locking element from the locking position into the unlocking position. The support may be a floating bearing. The support is, for example, substantially linear or point-like.

The securing mechanism may be configured in such a manner that the securing element is spaced apart from the locking element in the securing position when the locking element is in the locking position.

The securing mechanism may be configured in such a manner that the movement of the locking element from the locking position into the unlocking position involves or is a translation of the locking element along a first axis.

For example, the securing mechanism is configured in such a manner that a movement of the securing element from the release position into the securing position involves or is a rotation of the securing element about a second axis.

The first axis may extend obliquely with respect to the second axis.

The securing mechanism may be configured in such a manner that the support is spaced apart with respect to the second axis in a third direction, wherein the third direction extends obliquely with respect to the first axis and/or the second axis.

For example, the securing mechanism is configured in such a manner that the first direction extends at an angle with respect to the first axis and the securing element during rotation about the second axis rotates substantially through the angle.

According to a second aspect, a vehicle door which comprises the securing mechanism of the first aspect is provided.

According to a third aspect, a door system which comprises a vehicle door, a door frame and the securing mechanism of the first aspect is provided. In this instance, the locking system is arranged on the door and the actuator and the securing element are arranged on the door frame. The securing element may be connected to the door frame by means of the actuator.

According to a fourth aspect, a vehicle which comprises the securing mechanism of the first aspect, the vehicle door of the second aspect or the door system of the third aspect is provided. The vehicle may be an aircraft, in particular an airplane.

BRIEF DESCRIPTION OF THE DRAWINGS

Preferred embodiments of the invention will now be explained with reference to the appended schematic drawings, in which.

In the following, the same reference numerals refer to the same functional or structural features.

DETAILED DESCRIPTION OF THE PREFERRED EMBODIMENTS

Figure 1:
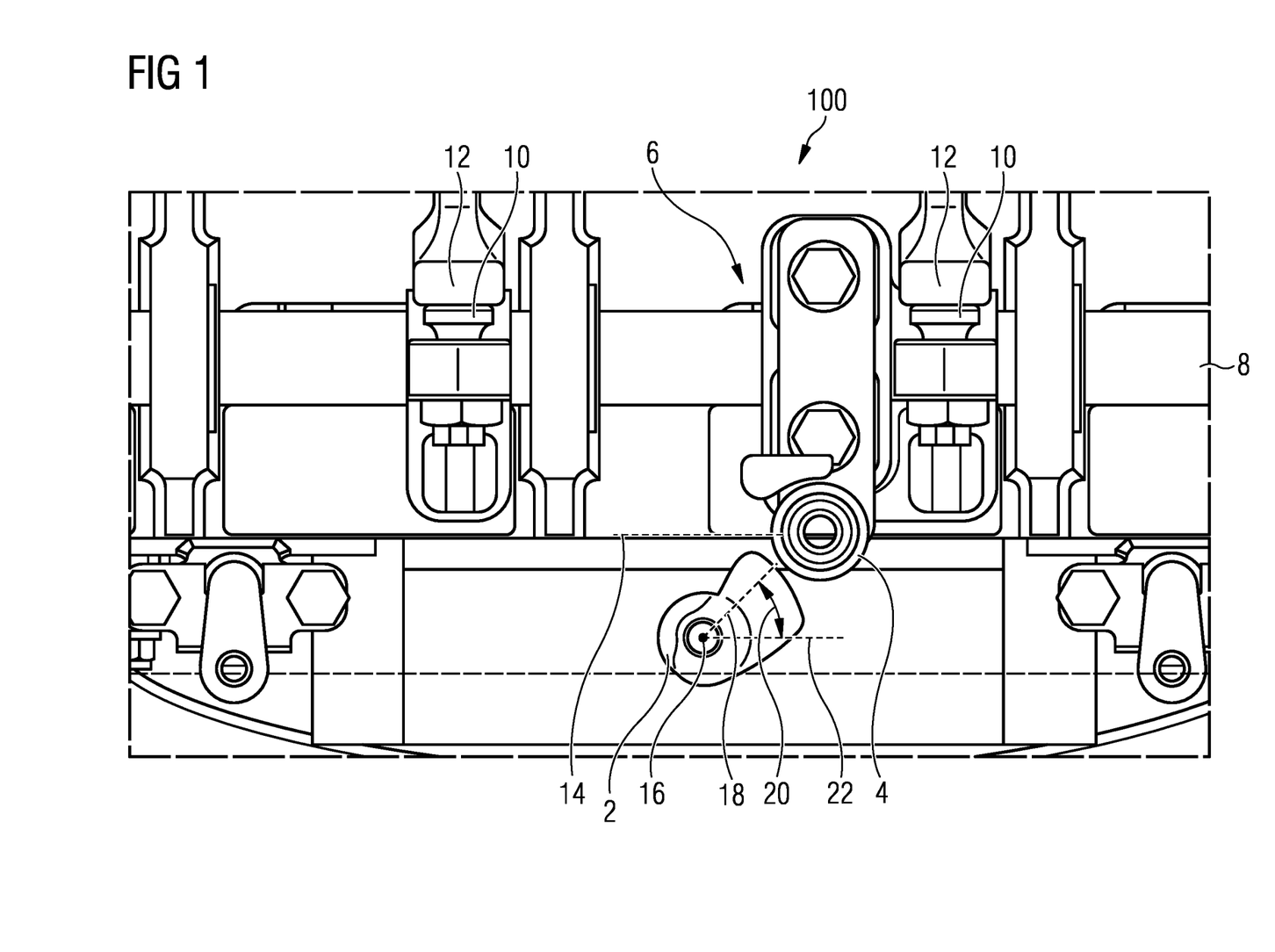
FIG. 1 shows a schematic illustration of a securing mechanism having a securing element in a securing position.

FIG. 1 shows a schematic illustration of a securing mechanism 100 for a vehicle door. The securing mechanism 100 comprises a securing element 2 which is in a securing position in FIG. 1. In this position, the securing element 2 serves to block a translation of the locking element 4 of the locking system 6 in a first direction (towards the left in FIG. 1). However, the securing element 2 in the securing position permits a movement of the locking element 4 in a second direction which differs from the first direction. The locking element 4 can thus, for example, move in FIG. 1 towards the right although the securing element 2 is in the securing position.

In FIG. 1, the locking element 4 is in a locking position in which the locking system 6 locks the vehicle door. In the example shown, the locking system 6 comprises a shaft 8 to which the locking element 4 is secured. There are further secured to the shaft 8 closure elements 10 which can cooperate with closure counter-pieces 12 in order to lock the vehicle door. From the locking position of the locking element 4 illustrated in FIG. 1, in order to enable the unlocking of the vehicle door, the locking element would have to be displaced together with the closure elements 10 towards the left into an unlocking position. This unlocking movement is blocked by the securing element 2 in the securing position.

The translational movement of the locking element 4 between the locking position and the unlocking position is carried out along a first axis 14. The securing element 2 is rotatably arranged about a second axis 16 and formed in a rotationally asymmetrical manner with respect to the second axis 16. The securing element 2 is rotated about the second axis 16 in order to move it from the securing position into a release position, which will be further explained in greater detail with respect to FIG. 2. The second axis 16 is orthogonal with respect to the first axis 14 but may also extend at another angle with respect to the first axis 14.

In the example shown, the locking element 4 is spaced apart from the securing element 2. The two elements 2, 4 are thus not in contact. If an attempt is made to move the locking element 4 along the first axis 14 into the unlocking position, however, there is contact between the two elements 2 and 4. This direct contact blocks a further displacement of the locking element 4 in the direction of the unlocking position.

The elements 2 and 4 are constructed in such a manner that, in the event of contact between the securing element 2 and the locking element 4, no complete or multi-dimensionally positive-locking connection is formed. It may be said that, in the event of contact, a connection which is positive-locking only in the first direction is formed between the securing element 2 and the locking element 4 so that the movement of the locking element 4 is blocked only in the first direction. In other words, the securing element 2 provides, in this instance, a support for the locking element 4, wherein the support brings about the blocking of the movement of the locking element 4 from the locking position into the unlocking position. This support is, in the case shown, a linear or point-like floating bearing. It may also be a laminar floating bearing. It can also thereby be ensured that the locking element 4 cannot be moved into the unlocking position as long as the securing element 2 is in the securing position. At the same time, it can be ensured that the locking element 4 can move in directions different from the first direction (for example, in the opposite direction).

As indicated in FIG. 1, the support or the predicted contact position of the elements 2, 4 is spaced apart with respect to the second axis 16 in a third direction 18. The third direction 18 extends with respect to the first axis 14 at an angle 20. This angle 20 is depicted in FIG. 1 for greater clarity with respect to an auxiliary axis 22 which extends parallel with the first axis 14 and which intersects the axis 16. The angle 20 is an acute angle and is preferably in a range from 15° to 75°, in particular from 30° to 60°. In the example shown, the angle 20 is approximately 45°. A reliable blocking of the movement of the locking element 4 can thereby be ensured.

Figure 2:
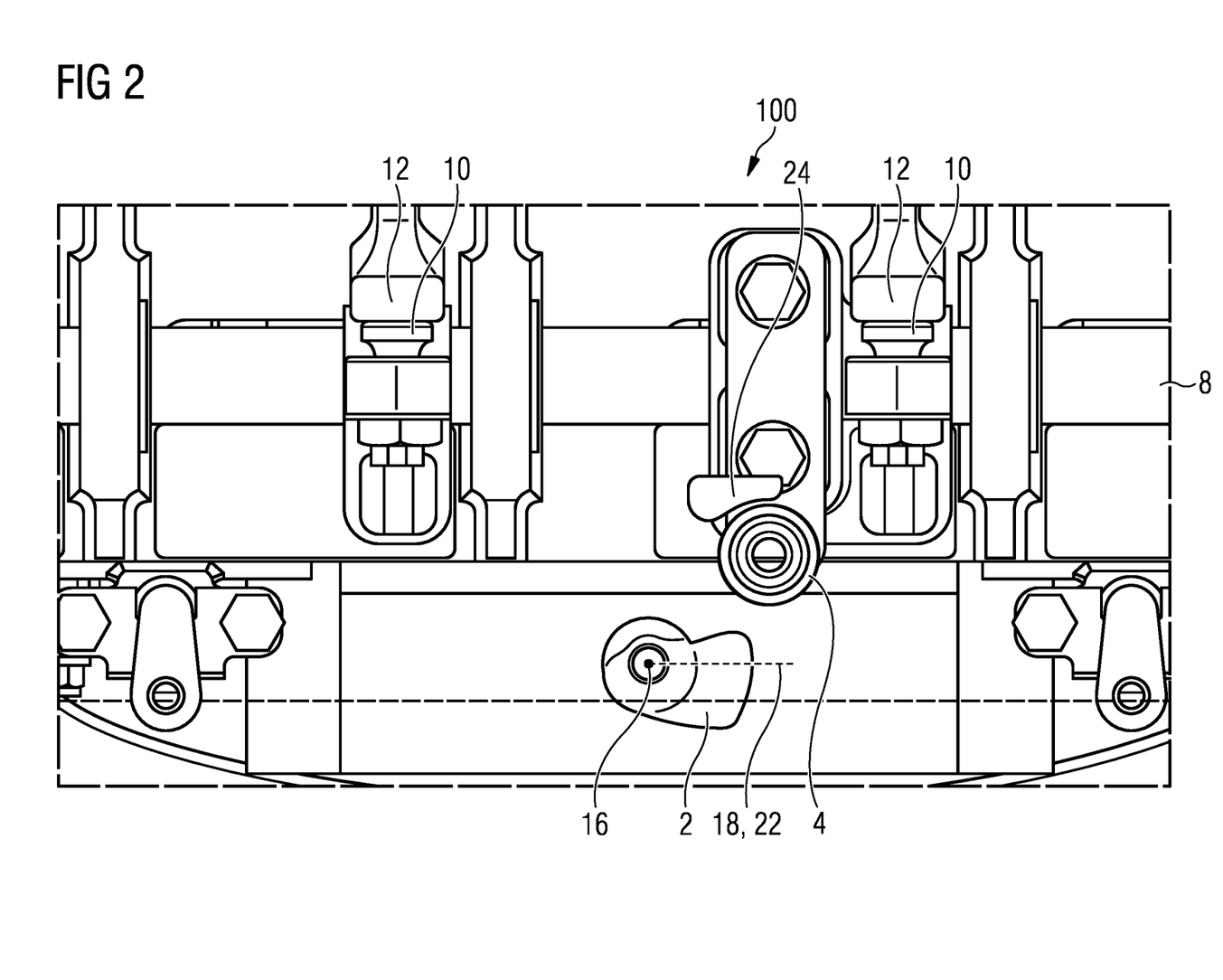
FIG. 2 shows a schematic illustration of the securing mechanism having the securing element in a release position.

FIG. 2 shows a schematic illustration of the securing mechanism 100 with the securing element 2 in the release position. In comparison with FIG. 1, it can be seen that the securing element 2 has been rotated in FIG. 2 in a clockwise direction about the second axis 16 from the securing position into the release position. The value of the rotation corresponds, in this example, to the angle 20, that is to say, 45°. In the release position, the securing element 2 enables all movements of the locking element 4, in particular the translation from the locking position into the unlocking position (towards the left in FIG. 2). It should also be noted in this regard that the component designated 24 when viewed in perspective is located in front of the locking system 6 and does not bring about a blocking of the locking element 4.

Figure 3:
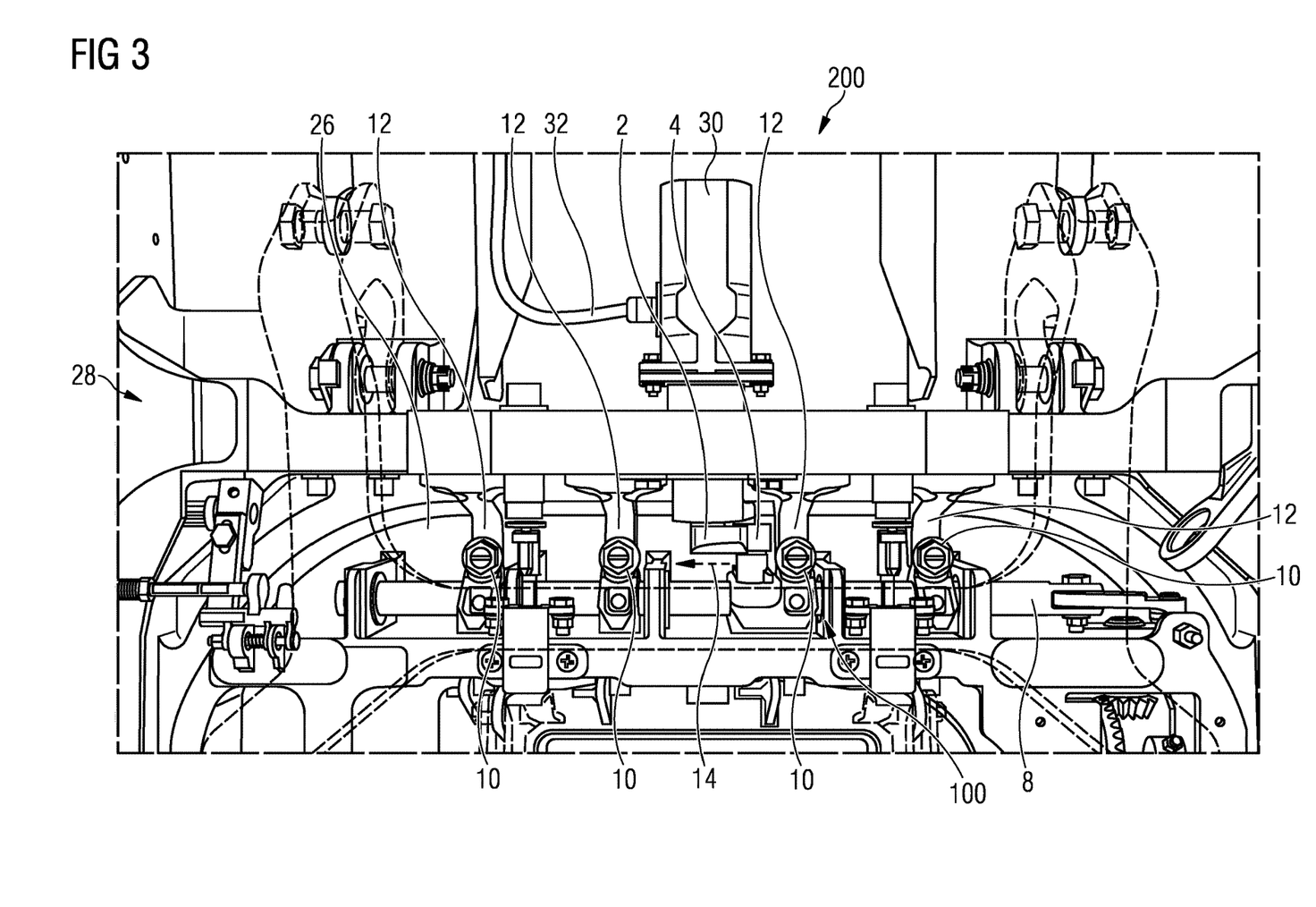
FIG. 3 shows a schematic illustration of a door system having the securing mechanism.

FIG. 3 shows a schematic illustration of a door system 200. The door system 200 comprises a vehicle door 26, a door frame 28 and the securing mechanism 100. The locking system 6 is arranged on the door 26. The door frame 28 may be part of a fuselage of a vehicle or be able to be installed or be installed in the fuselage of the vehicle. In particular, the door frame 28 may be formed by the vehicle fuselage.

The securing mechanism comprises an actuator 30 which is configured to move the securing element 2 from the release position into the securing position and/or from the securing position into the release position. The actuator 30 is, for example, wired, and is operated electrically or hydraulically. To this end, a connection cable 32 may be connected to the actuator. The actuator 30 is arranged on the door frame 28, as is the securing element 2. In this configuration, the cable 32 does not have to be guided from the fuselage side to the door 26 since the actuator 30 is secured to the door frame 28. In particular, the actuator 30 and the securing element may be arranged in the region of a door lintel of the door frame 28. In the state shown in FIG. 3, the securing element 2 is in the release position.

Figure 4:
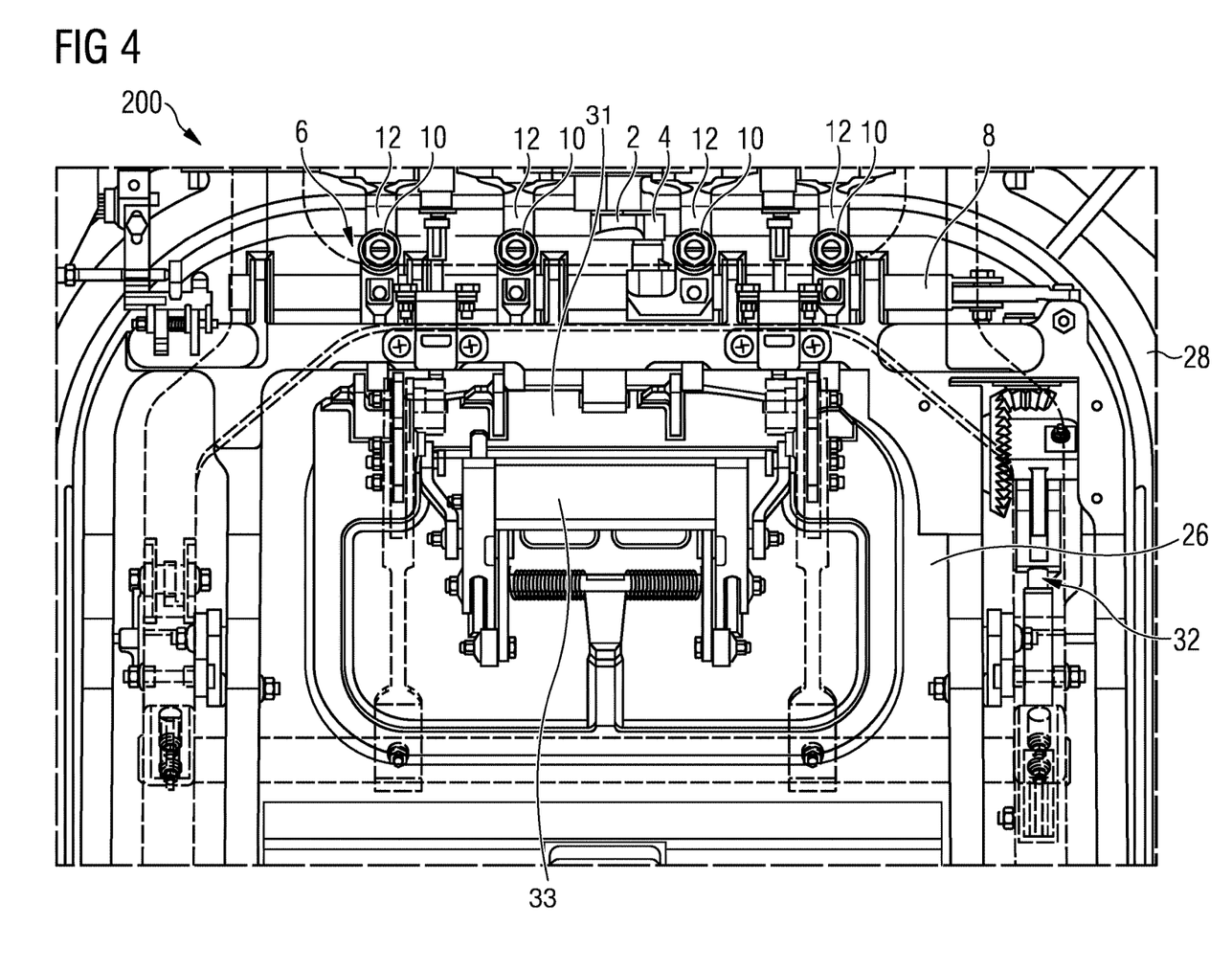
FIG. 4 shows a schematic illustration of the door system in a first state.

FIG. 4 shows a schematic illustration of the door system 200 in a first state. The door 26 may, in this instance, comprise a pressure compensation valve 31 which is connected to a handle 33. The handle 33 serves to open the pressure compensation valve 31 and is, in the example shown, connected to the locking system 6 by means of a coupling mechanism 32. The coupling mechanism 32 is configured to convert a movement of the handle 33 into a translation of the locking element 4 so that, when the handle 33 is activated (in a downward direction in FIG. 4), the locking element 4 is moved from the locking position into the unlocking position (towards the left in FIG. 4). In the illustrated first state, the handle 33 has not yet been activated and the locking element 4 is in the locking position. The closure elements 10 are located in front of the closure counter-pieces 12, whereby an opening of the door (in FIG. 4, into the image plane) is prevented. The door 26 is thus locked in the first state of the door system 200 although the securing element is in the release position.

Figure 5:
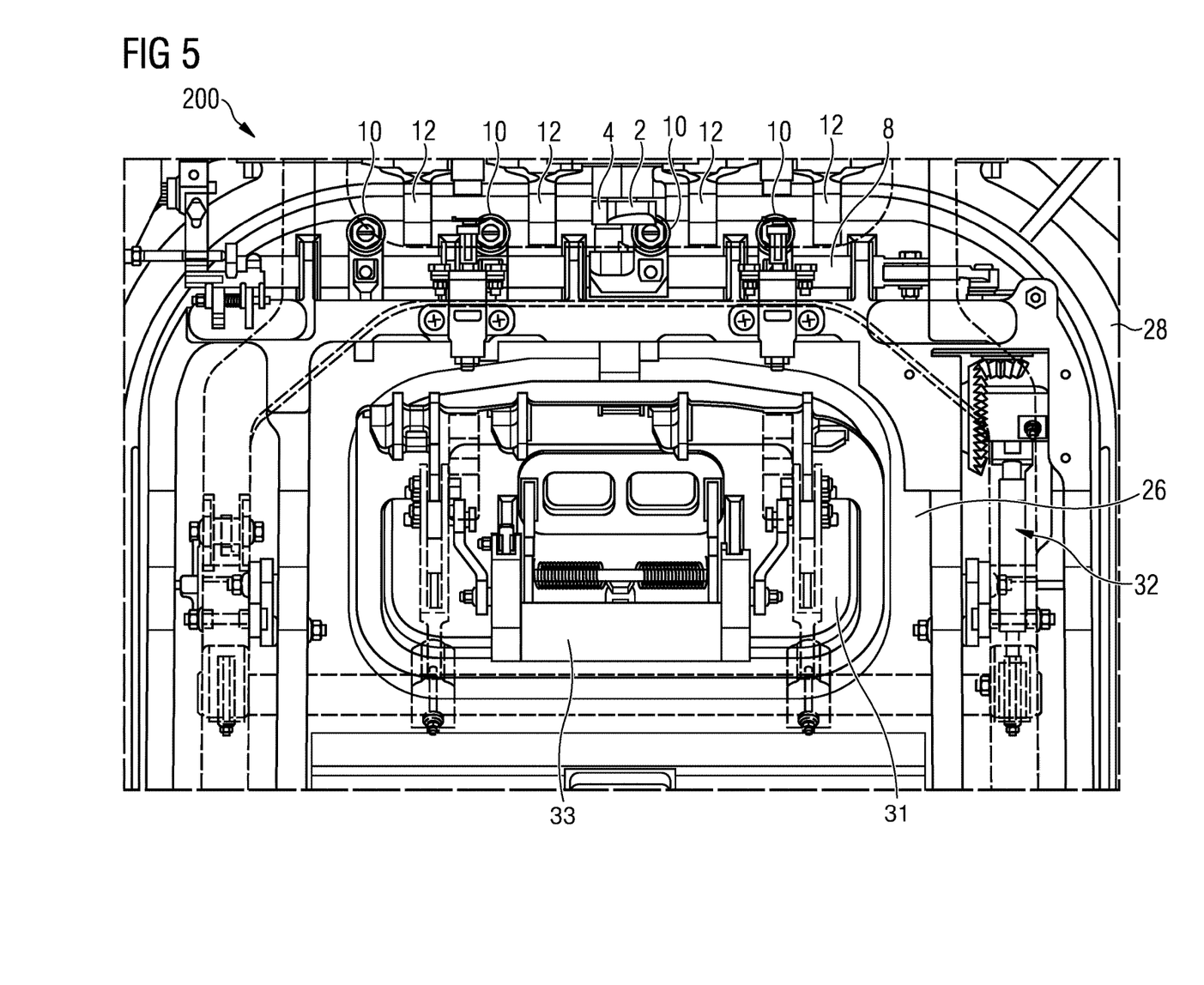
FIG. 5 shows a schematic illustration of the door system in a second state.

FIG. 5 shows a schematic illustration of the door system in a second state. The securing element 2 is also in the release position in this instance. It can be seen that the handle 33 has been moved downwards with respect to FIG. 4. The pressure compensation valve 31 was thereby opened and the locking element 4 was displaced along the axis 14 into the unlocking position (towards the left). The closure elements 10 are no longer in front of the closure counter-pieces 12 so that it is possible to open the door. The door 26 is thus unlocked in the second state of the door system shown.

Of course, the entire securing mechanism 100 may also be arranged on or in the door 26. In this instance, in particular the actuator 30 and the securing element 2 would be arranged on or secured to the door 26, in the same manner as the locking system 6.

Figure 6:
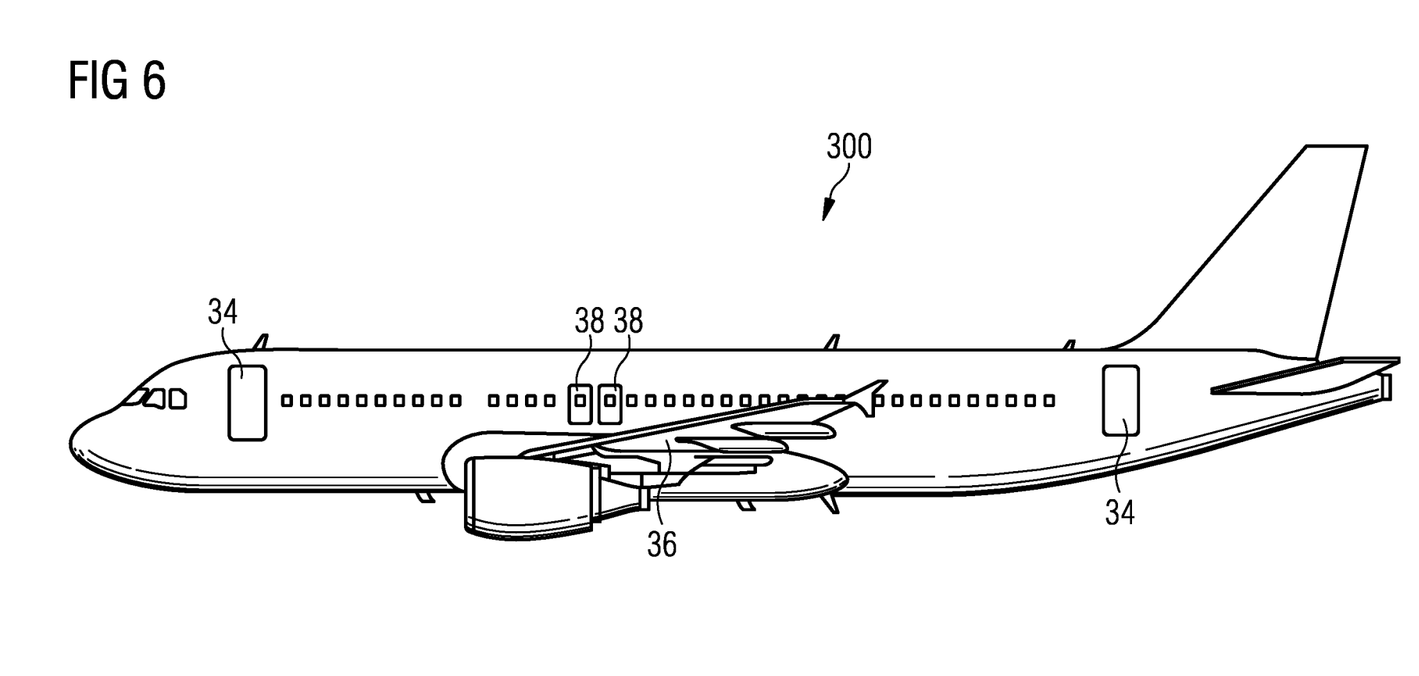
FIG. 6 shows a schematic illustration of an aircraft.

FIG. 6 shows a schematic illustration of an aircraft 300. The aircraft comprises, in each case, at the front end and at the rear end, a passenger door 34. Emergency exit doors 38 are provided above the wings 36. The securing system 100 or the door system 200 can be used for one or more of the doors 26, 38.

According to the present disclosure the securing element 2 can be mechanically uncoupled from the locking element 4, both in the securing position and in the release position of the securing element 2. The small contact of the two elements 2 and 4 acting as floating bearings can also minimize wear. Furthermore, as a result of the described configuration, a very reliable securing mechanism 100 in the manner of an FLA can be provided. The securing mechanism 100 enables a separate arrangement of the actuator 30 and locking system 6, for example, a positioning of the actuator 30 on the fuselage of the aircraft 300. Assembly complexity and cable wear can thus be minimized. In this instance, no cable guiding from the fuselage side of the vehicle 300 to an actuator 30 which is arranged on the door 26 is also required. Additional assembly costs and also weight can thus be saved.

Of course, yet other advantages of the invention described herein are possible. Of course, the aspects, embodiments and examples described herein can be combined with each other, wherein individual features may be omitted.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft door system comprising:
a vehicle door;
a door frame; and
the securing mechanism for securing the vehicle door, wherein the securing mechanism comprises:
a locking system which comprises a locking element and which is configured, in a locking position of the locking element, to lock the vehicle door in a closed position and, in an unlocking position of the locking element, to unlock the vehicle door;
a securing element which is configured, in a securing position, to block a movement of the locking element from the locking position into the unlocking position in a first direction and, in a release position, to allow the movement of the locking element from the locking position into the unlocking position in the first direction; and
an actuator which is configured to move the securing element from at least one of the release position into the securing position or the securing position into the release position,
wherein the securing element is further configured, in the securing position, to allow a movement of the locking element in a second direction,
wherein the locking system is arranged on the door, and wherein the actuator and the securing element are arranged on the door frame.

2. The aircraft door system according to claim 1, wherein the securing element is configured, in the securing position, when the locking element is moved from the locking position into the unlocking position, to come into contact with the locking element and, by means of the contact between the securing element and the locking element, to block the movement of the locking element from the locking position into the unlocking position.

3. The aircraft door system according to claim 2, configured in such a manner that, upon the contact between the securing element and the locking element, a connection, which is positive-locking only in the first direction, is formed between the securing element and the locking element.

4. The aircraft door system according to claim 2, configured in such a manner that the securing element in the securing position, in the event of contact with the locking element, provides a support for the locking element, wherein the support brings about the blocking of the movement of the locking element from the locking position into the unlocking position.

5. The aircraft door system according to claim 4, wherein the support is a floating bearing.

6. The aircraft door system according to claim 4, wherein the support is substantially linear or point-like.

7. The aircraft door system according to claim 1, configured in such a manner that the securing element is spaced apart from the locking element in the securing position when the locking element is in the locking position.

8. The aircraft door system according to claim 1, configured in such a manner that the movement of the locking element from the locking position into the unlocking position involves or is a translation of the locking element along a first axis.

9. The aircraft door system according to claim 8,
configured in such a manner that a movement of the securing element from the release position into the securing position involves or is a rotation of the securing element about a second axis, and
wherein the first axis extends obliquely with respect to the second axis.

10. The aircraft door system according to claim 9,
configured in such a manner that the securing element in the securing position, in the event of contact with the locking element, provides a support for the locking element, wherein the support brings about the blocking of the movement of the locking element from the locking position into the unlocking position,
configured in such a manner that the support is spaced apart with respect to the second axis in a third direction,
wherein the third direction extends obliquely with respect to at least one of the first axis or the second axis.

11. The aircraft door system according to claim 10, configured in such a manner that the first direction extends at an angle with respect to the first axis and wherein the securing element during rotation about the second axis rotates substantially through the angle.

12. The aircraft door system according to claim 1, configured in such a manner that a movement of the securing element from the release position into the securing position involves or is a rotation of the securing element about a second axis.

13. A vehicle comprising the aircraft door system according to claim 1.

14. The vehicle according to claim 13, wherein the vehicle comprises an airplane.

* * * * *